United States Patent [19]

Cawthorne

[11] 3,887,432
[45] June 3, 1975

[54] 6-AMINOPENICILLANIC ACID PREPARATION

[75] Inventor: Michael Anthony Cawthorne, Horsham, England

[73] Assignee: Beecham Group Limited, England

[22] Filed: Nov. 14, 1973

[21] Appl. No.: 415,688

[30] Foreign Application Priority Data
Nov. 21, 1972 United Kingdom............... 53822/72
Sept. 22, 1973 United Kingdom............... 44542/73

[52] U.S. Cl............ 195/36 P; 195/63; 195/DIG. 11
[51] Int. Cl............................................. C12d 1/02
[58] Field of Search............. 195/36 P, DIG. 11, 63

[56] References Cited
UNITED STATES PATENTS
3,625,827  12/1971  Wildi et al................. 195/DIG. 11
3,649,457  3/1972  Westman..................... 195/DIG. 11
3,736,230  5/1973  Delin................................ 195/36 P Primary Examiner—Alvin E. Tanenholtz

[57] ABSTRACT

6-Aminopenicillanic acid is prepared by enzymatic degradation of benzylpenicillin or of phenoxymethylpenicillin at pH 6.0–9.0 using a novel water-soluble enzyme complex derived from a penicillin deacylase enzyme bonded to a water-soluble polymeric material, the formed 6-aminopenicillanic acid being separated from the complex by an ultrafiltration technique, the said complex being recycled for re-use and the formed 6-aminopenicillanic acid being recovered. Preferably the complex is formed from a maleic acid copolymer or a modified polysaccharide, especially from a sucrose-epichlorhydrin copolymer.

5 Claims, 1 Drawing Figure

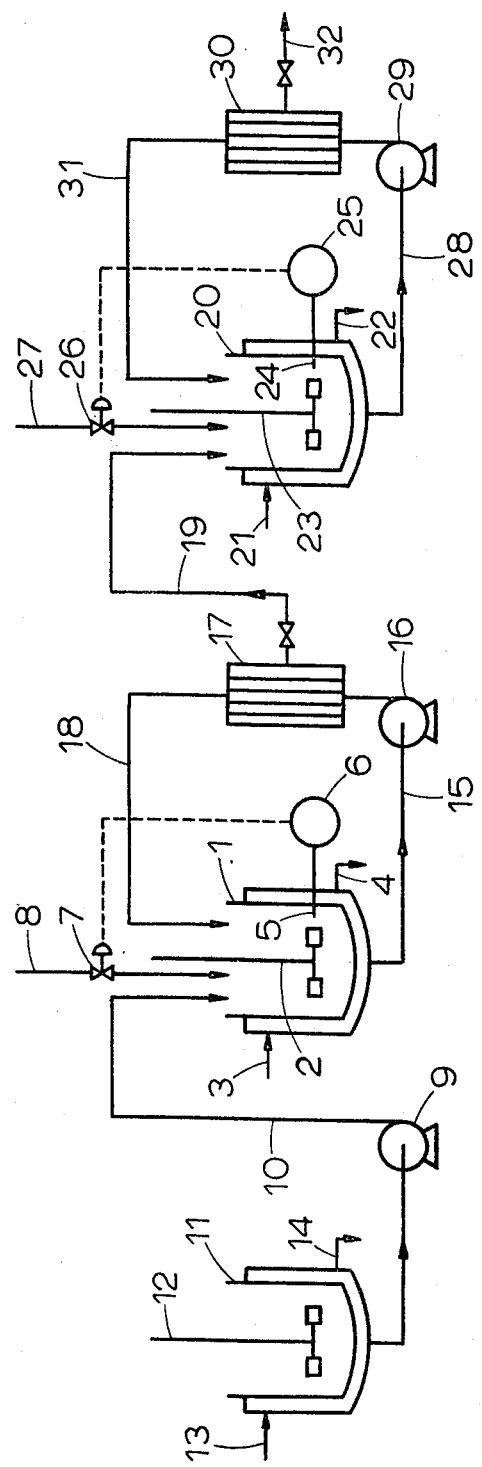

3,887,432

6-AMINOPENICILLANIC ACID PREPARATION

This invention relates to an improved process for the preparation of 6-aminopenicillanic acid (hereinafter termed 6-APA). The invention also relates to particular enzyme preparations for use in such a process.

It is well-known that 6-APA may be produced by the action on a penicillin of certain enzymes which split the amido bond of the penicillin. The enzymes which are known to split this amido bond are hereinafter termed penicillin deacylase enzymes, though they may also be described as penicillin amidases.

It is known to link penicillin deacylase enzymes to water-insoluble polymeric materials, thereby producing a water-insoluble enzyme complex which retains its penicillin deacylase activity. Such insoluble enzyme complexes are of value in that the resulting 6-APA is substantially free from enzyme. In addition, the enzyme complex is easily stored and transported.

It is also known that water-soluble enzyme complexes can be prepared by linking enzymes to water-soluble polymeric materials. However, it has not hitherto been proposed to use a penicillin deacylase enzyme in this way. This is doubtless because such is contra-indicated by the beliefs that such a complex could not readily be separated and recovered for re-use from the aqueous reaction mixture used to produce the 6-APA, and that use of such an enzyme in this way would be unlikely to be commercially feasible.

It has now been found that penicillin deacylase enzymes can be linked to water-soluble polymeric materials to produce water-soluble enzyme complexes and that such complexes retain the deacylase activity of the free enzyme. Moreover, it has also been found that, when such an enzyme complex is used in the production of 6-aminopenicillanic acid, more concentrated solutions can be used than with the water-insoluble complexes and this leads to the economic advantages of greater through-put or the capability of using chemical plant of smaller size. Furthermore it has been found that the water-soluble enzyme complex can be separated from the aqueous solution of 6-APA produced by the use of ultrafiltration techniques. This leaves the aqueous solution of 6-APA and any unreacted penicillin from which the 6-APA may readily be isolated by concentration of the solution followed by adjustment of the pH to about the isoelectric point of 4.3. The separated enzyme complex is still in aqueous solution and is found to retain its deacylase activity to a high degree. These two properties enable it to be re-used without further treatment. Moreover these enzyme complexes permit the preparation of 6-APA in solutions of higher concentration. Thus the present discoveries make possible the economic production of 6-APA, especially by a continuous process carried out throughout in a homogeneous aqueous medium.

Accordingly from one aspect, the invention provides a process for the preparation of 6-aminopenicillanic acid, which process comprises contacting, in aqueous solution maintained at a pH within the range 6.0 to 9.0, benzylpenicillin or phenoxymethylpenicillin or a salt thereof with a water-soluble enzyme complex wherein a penicillin deacylase enzyme is bonded to a water-soluble inert polymeric material; thereafter separating the said enzyme complex from the aqueous reaction mixture by an ultrafiltration technique; recovering the formed 6-aminopenicillanic acid; and re-using the separated aqueous solution of the enzyme complex by contacting it with a further quantity of the penicillin.

The said enzyme complexes are novel. Accordingly, from a second aspect, the invention also provides a water-soluble enzyme complex which comprises a penicillin deacylase enzyme bonded to a water-soluble inert polymeric material.

Preferably the deacylase enzyme for present use is obtained from bacteria, such as strains of *Escherichia coli*, when used for the splitting of benzylpenicillin; or from fungi or actinomycetes when used for the splitting of phenoxymethylpenicillin. Such enzymes are in general well-known. They are used in the production of 6-APA within the pH range of 6.0 to 9.0, preferably at pH 7.0 to 8.5. Since deacylation of a penicillin results in liberation of a free acid from the penicillin side chain, it is necessary to maintain the above-mentioned pH range during the process for preparing 6-APA by the addition as necessary of an alkali, such as a solution of sodium or ammonium hydroxide or triethylamine.

A wide variety of water-soluble polymeric materials may be used to prepare the water-soluble enzyme complexes of the invention and those that are particularly useful can only be determined on an empirical basis.

One type of polymer that has been found to be particularly suitable are water-soluble copolymers of maleic anhydride. For instance, there may be used water-soluble copolymers of maleic anhydride or acrylic anhydride with vinyl methyl ether; ethylene; styrene; and-/or vinyl acetate. One particularly suitable range of water-soluble copolymers are the methyl vinyl ether/-maleic anhydride copolymers sold under the Trade Name "GANTREZ AN," particularly "GANTREZ AN 149" (a copolymer of molecular weight about 750,000) and "GANTREZ AN 169" (a copolymer of molecular weight about 1,125,000). The maleic anhydride copolymers may be reacted with the penicillin deacylase enzyme by any of the general methods described in West German Offenlegungsschrift No. 1,945,680 (British Pat. No. 1,290,701). For example the enzyme may be reacted with a GANTREZ AN polymer in the presence of a strong buffer solution or other means of maintaining a neutral pH.

Other very suitable water-soluble polymer substrates are polysaccharides. Thus there may be used such polysaccharides as dextran, dextrin or cellulose, provided that such is water-soluble and leads to a water-soluble enzyme complex after it has been coupled to the penicillin deacylase enzyme. Such coupling is usually effected after appropriate activation of the polysacchride by reaction with such modifying agents as for example, epichlorhydrin or cyanogen halides or it may be a polysaccharide that has previously been modified to provide it with residual carboxymethyl-, hydroxyethyl— or aminoethyl— groups.

It has further been found particularly suitable to use for the purposes of the present invention polymers that are modified saccharides or oligosaccharides, such as sucrose, dextrose or lactose. An especially useful polymer of this type is one that is commercially available under the Trade Name "FICOLL," which is a sucrose-epichlorhydrin copolymer. A FICOLL polymer with a molecular weight of about 400,000 has been found to be particularly suitable. The use of polymers of this type provides a water-soluble penicillin deacylase enzyme with a high activity in the preparations of 6-aminopenicillanic acid. However, of more importance, such enzyme complexes have a particularly low viscosity and this enables them to be more readily separated by ultrafiltration techniques from the reaction mixture in which they have been used for the preparation of 6-APA; and therefore they may be more conveniently separated and recycled for re-use.

The water-soluble enzyme complexes for present use may be prepared by any of the known methods for linking enzymes to polymers provided that the resulting complex can be regarded as water-soluble. The use of the term "water-soluble" herein means that the enzyme complex is soluble, or dispersible in water to yield a true or colloidal solution to the extent of at least 0.1 gram per litre at pH 7.8.

Such linking methods include, for example, coupling the deacylase enzyme to the polymer by the use of such reagents as cyanogen halides, particularly cyanogen bromide; s-triazines, particularly 2-amino-4,6-dichloro-s-triazine; azides, for example 2-hydroxy 3-(p-diazophenyl) propyl ether; organic cyanates such as phenyl cyanate; and di-organocarbodiimides. Often such linking agents are used first to react with the polymer and provide reactive groups on the same, which groups are then caused to react with the enzyme. In some cases the enzymes may react directly with the polymer, for example if this contains, or has been modified to contain, certain active groups such as anhydride linkages, aminoethyl, hydroxyethyl or carboxymethyl substituents.

The complexes for present use may also be made by linking the enzyme to a water-insoluble polymer, such as cross-linked dextran, and then rendering the resulting complex water-soluble by an appropriate degradation process, e.g., by partial hydrolysis or by reaction of a cross-linked dextran with dextranase.

It is also possible to modify the activity of the enzyme complexes for present use by bonding the enzyme to the polymer substrates with the aid of spacer groups. Thus the enzyme may be bonded to the polymer by means of bridges formed from, for example, dialdehydes such as glyoxal or glyceraldehyde; and/or by diamines, such as 1,6-hexamethylene diamine or ethylene diamine; and/or $\alpha$-$\omega$-aminoaliphatic carboxylic acid such as glycine or $\epsilon$-aminohexanoic acid.

The penicillin deacylase enzyme may be linked to the polymer within a wide range of proportions, for example within the weight ratio of polymer:enzyme of 0.1 to 100:1. However, it is preferred to employ the polymer and enzyme in a proportion of polymer:protein within the range 2:1 to 20:1.

After preparation, the water-soluble enzyme complex may conveniently be purified before use by ultrafiltration or by gel-permeation chromatography, e.g., on Sephadex G-100.

The water-soluble enzyme derivatives of the invention retain the activity of the parent deacylase enzyme and may thus be used in batch or continuous processes for the production of 6-APA.

An integral part of the plant used for the production of 6-APA using the complexes of this invention is an ultrafiltration facility. This involves the use of a semipermeable membrane having limits of exclusion which permits the passage of low molecular weight substances but prevents the passage of high molecular weight substances. The limit of exclusion is chosen according to the molecular weight of the enzyme complex. It is selected to allow passage of 6-APA but to exclude the enzyme/polymer complex, thereby permitting its recovery for re-use.

By the ultrafiltration technique the water-soluble complex is recovered in aqueous solution and this permits it to be recycled directly for re-use. Purification of the enzyme complex before re-use is generally not necessary.

A particularly suitable method which can be used for the continuous production of 6-APA according to the invention will now be described with reference to the accompanying drawing, which is a diagrammatic representation of a chemical plant suitable for the aforesaid purpose.

A reactor tank 1 is provided with a stirrer 2 and a jacket through which water at a predetermined temperature flows from the inlet 3 to the outlet 4. The vessel contains a pH responsive element 5 which by means of a controller 6 actuates a tap 7 in a feed line 8 through which an alkaline solution is fed to maintain the pH of the contents of the vessel 1 at a predetermined level. Into the reactor tank 1 a solution of the penicillin can be pumped by pump 9 in the line 10 from a storage tank 11 fitted with a stirrer 12, the tank 11 also being provided with a water jacket with inlet 13 and outlet 14 through which water can flow to control the penicillin solution at the desired reaction temperature.

The reaction mixture may be withdrawn from the reactor tank 1 through a line 15 and pumped by a pump 16 into an ultrafiltration unit 17. The retentate solution from the unit is returned via line 18 to the reactor tank 1.

The permeate solution from the ultrafiltration unit 17 can be passed directly to a recovery unit (not shown) wherein the formed 6-APA can be separated as a crystalline solid after conventional concentration of the solution and pH adjustment towards the isoelectric point of 6-APA. However, preferably the permeate solution from the unit 17 passes via line 19 to a further reactor tank 20, fitted like reactor tank 1 with a water jacket with inlet 21 and outlet 22, a stirrer 23, a pH responsive element 24 and a pH control unit 25 activating a tap 26 in an alkali feed line 27. From the second reactor tank 20 the reaction mixture is withdrawn by line 28 by means of a pump 29 into a second ultrafiltration unit 30 from which the retentate solution is recycled via line 31 to the second reactor tank 20 and the permeate solution passes via line 32 to a recovery unit (not shown) wherein the formed 6-APA is recovered as described above.

Preferably in such a process a solution of benzylpenicillin of about 7% w/v concentration is employed together with sufficient of the enzyme complex to degrade about 90% of the penicillin in 3 hours. The reaction mixture is withdrawn from the tank 1, and fresh penicillin solution is pumped thereinto from the tank 11 at controlled rates so that the average residence time of the solution in the reactor is about 3 hours. Thus the contents of the tank 1 are allowed to react for 3 hours before any is withdrawn via line 15 and fresh solution allowed to enter via line 10. In the second reactor tank 20 the average residence time is controlled by the pumps 16 and 29 to be about 1 hour which is sufficient to ensure degradation of any penicillin left unreacted in the first reactor tank 1 and which passes with the formed 6-APA through the first ultrafiltration unit 17.

In the above-described chemical plant the reactor vessels may be replaced if desired by a series of jacketed tubular reactors with provision for the sequential addition of alkali solution as the reaction mixture passes therethrough.

This continuous reaction is particularly easy to carry out where the enzyme complex is derived from a modified polysaccharide, especially from a sucrose-epichlorhydrin copolymer, because of the low viscosity of their solutions which enables the ultrafiltration steps to be carried out without attendant technological problems.

The invention is illustrated by the following Examples in which the activity is expressed in μmoles of 6-aminopenicillanic acid produced from benzylpenicillin at pH 7.8 and 37°C per minute per gram or ml of preparation.

EXAMPLE 1

1g of a maleic anhydride/methyl vinyl ether copolymer of molecular weight about 750,000 (GANTREZ AN 149) was stirred into 100 ml of 0.2 M phosphate buffer at pH 7.4 at 4°C. After 3 mins. 5 ml of a solution of partially purified penicillin deacylase enzyme of activity 63.4 μmoles/min/ml was added and the whole stirred for 16 hours at 4°C. The resulting viscous solution was subjected to ultrafiltration through an XM-300 membrane (Amicon Corp.), which has a molecular weight cut-off at 300,000. The retentate was washed in the ultrafiltration cell and finally freeze-dried. The resulting enzyme complex was water-soluble and had an activity of 220 μmoles/min/g. when used to prepare 6-aminopenicillanic acid from benzylpenicillin.

EXAMPLE 2

10g of GANTREZ AN -149 polymer was stirred into 1 litre of 0.2 M phosphate buffer at pH 7.4 at 4°C. After 3 minutes., 50 mls of the penicillin deacylase preparation used in Example 1 was added and the whole stirred for 3 hours. A solution of 1% hexamethylenediamine was then added (100 ml) and the whole mixture stirred for a further 16 hours. A portion of the resulting water-soluble enzyme complex was used directly for the enzymatic degradation of 6% benzyl penicillin on the 200 ml scale at pH 7.8 and 47°C. The deacylation efficiency after a reaction time of 5 hours was 89%.

A further portion (50 mls) of the soluble product was subjected to ultrafiltration as described in Example 1. The freeze-dried product had an activity of 168 μmoles/min/g.

EXAMPLES 3 – 5

These preparations used as the enzyme support GANTREZ AN - 169 which is a maleic anhydride/- methyl vinyl ether copolymer with a molecular weight of about 1,125,000. The addition of the enzyme to the polymer support was carried out as described in Example 1. The results together with those from Examples 1 and 2 are shown in the table.

EXAMPLE 6

Ficoll (5g) which is a sucrose-epichlorhydrin copolymer of mol.wt. 400,000, was dissolved in water (165 ml) and the pH adjusted to 10.0 with 2N NaOH. Cyanogen bromide (400 mg) was added to the Ficoll solution and the solution stirred magnetically, the temperature being maintained at 20°C. The pH was maintained at 11.0 by the addition of 2N NaOH. 20 min. after the addition of the cyanogen bromide the solution was adjusted to pH 8.5 with 2N HCl and mixed with 170 ml of an aqueous solution of penicillin deacylase (560 mg protein) having an activity such that it will produce 6.9 μmoles of 6-APA per milligram of protein per minute at pH 7.8 and 37°C. The solution was agitated overnight at 4°C and it was then concentrated by ultrafiltration through a XM-300 Amicon membrane. This membrane has a nominal molecular weight cut-off of 300,000. The retentate in the ultrafiltration cell, which contained the Ficoll-penicillin deacylase complex, was washed. The volume of the retentate was then reduced to 44 ml. and the product was stored at 4°C. The retentate had a similar viscosity to the native enzyme. The activity of the Ficoll-penicillin deacylase complex was determined as follows:

A phosphate buffer (15 ml:0.2M) and benzylpenicillin solution (5 ml. 20% w/v) were allowed to stabilise at 37°C to pH 7.8 by the addition of 0.1N NaOH. The enzyme solution (2 ml) was added to start the reaction. The pH of the reaction was maintained at pH 7.8 by the addition of 0.1N NaOH. The reaction was continued for 20 min. and readings were taken every minute.

Using this procedure it was found that the Ficoll-penicillin deacylase enzyme complex retained 86.2% of the activity of the native deacylase enzyme. The protein content of the Ficoll-penicillin enzyme complex was assessed by the method of Lowry, Rosebrough, Farr and Randall (1951). Using this procedure it was shown that the overall coupling yield was 87.1%.

EXAMPLE 7

Example 6 was repeated but the pH at which the coupling took place between the penicillin deacylase and the activated Ficoll was 10.0 rather than 8.5. The volume of the final product was 40 ml. The overall coupling yield based on protein retained in the ultrafiltration retentate was 78.5%. The enzyme activity retained was 74.8%.

| | Molar ratio Polymer/enzyme in reaction vessel | Protein content of product by Folin-Ciocalteu method using bovine serum albumin as standard | Enzyme Activity | |
|---|---|---|---|---|
| | | | μ moles/min/ml(g) | μ moles/min/mg protein |
| Free deacylase enzyme | — | 20 mg/ml | 63.4/ml | 31.7 |
| Example 1 | 2 : 1 | 55.0/mg/g | 220/g | 40.2 |
| Example 2 | 2 : 1 | 52.5/mg/g | 168/g | 32.2 |
| Example 3 | 1 : 1 | 43.3/mg/g | 95.5/g | 220.0 |
| Example 4 | 2 : 1 | 18.6/mg/g | 44.5/g | 24.0 |
| Example 5 | 1 : 2 | 71.4/mg/g | 172/g | 24.0 |

EXAMPLE 8

Example 6 was again repeated but the pH at which the coupling took place between the penicillin deacylase and the activated Ficoll was 6.0. The volume of the final product was 35 ml. The overall coupling yield based on protein retained in the ultrafiltration retentate was 68%. The enzyme activity retained was 56.7%.

EXAMPLE 9

Example 6 was repeated but using dextran having a molecular weight of 250,000 instead of Ficoll. The volume of the final product was 44 ml. The solution of the dextran-penicillin deacylase complex was much more viscous than that of the Ficoll-penicillin deacylase complex. The overall coupling yield based on protein retained was 73.2%. The enzyme activity that was retained in the dextran-penicillin deacylase complex was 75.5%.

EXAMPLE 10

Reusability Study

The solution of Ficoll-penicillin deacylase complex (4 ml = 44.4 mg protein), which had been prepared according to the method in Example 6, was added to a solution of 6.3 g potassium benzylpenicillin in water and stirred at 37°C. The pH value of the reaction mixture was kept constant at 7.8 by the continuous addition of 0.1N NaOH using a titrimeter. The reaction was complete after about 4 hr. although it was continued for 6 hr. The uptake of 0.1N NaOH indicated that the yield of 6-APA was 96.2% of the theoretical. The enzyme was separated from the reactants of small molecular weight by ultrafiltration through a membrane having a molecular weight cut-off of 50,000. After washing the enzyme in the ultrafiltration cell with distilled water, the enzyme-polymer was again subjected to ultrafiltration until the volume was reduced to 150 ml. The retentate was reused for the conversion of a further batch of 6.3 g potassium benzylpenicillin, which was converted to 6-APA with an efficiency of 96.5%. The whole cycle was repeated for a further three times the yields of 6-APA being 92.0, 96.0 and 91.0% of the theoretical value.

EXAMPLE 11

18.5 ml of a Ficoll-penicillin deacylase complex which had been prepared according to the method in Example 6 was made up to 400 ml with distilled water and stirred at 37°C and pH 7.8. 25 g potassium benzyl penicillin were added and the pH was kept constant at 7.8 by the continuous addition of 10M $NH_4OH$. The reaction was continued for 4 hours. The enzyme was separated from the reactants of small molecular weight by dialysis against distilled water using a hollow fibre dialyser (Model DC2, Amicon Corporation; Lexington, Mass. USA) with a dialysing cartridge having a molecular weight cut-off of 50,000. The enzyme solution was then concentrated to approximately 100 ml. The dialyser unit was then washed with 2 × 100 ml aliquots of distilled water and these were bulked together with the enzyme solution and stored at 4°C between each experiment.

Seven successive experiments were carried out and the efficiency with which potassium benzyl penicillin was hydrolysed to yield 6-APA was 93.2%. The efficiency of enzyme recovery was 99.6% of which 2.5% was lost in samples taken during each experiment. Fresh enzyme was added prior to each experiment to compensate for any losses.

EXAMPLE 12

An enzymic hydrolysis of potassium benzyl penicillin using a Ficoll-penicillin deacylase complex was carried out according to the method described in Example 11. The reaction was continued for 4 hours at pH 7.8 and 37°C. The enzyme was separated from the reactants of small molecular weight in the following manner. The volume of the reaction mixture was reduced to approximately 40 ml by ultrafiltration through a hollow fibre membrane having a molecular weight cut-off of 50,000. 20 ml of distilled water were added to the concentrate and the concentration process was repeated. The 2 aliquots of liquor were bulked and the volume was reduced to 120 ml in a rotary evaporator at 35°C. An equal volume of methyl isobutyl ketone (MIBK) was added to the concentrate and the mixture was vigorously stirred in a chilled metal vessel. When the temperature had fallen to 4°C nitric acid was slowly added until the pH was 4.3. Stirring was continued for a further 30 minutes. The precipitated 6-APA was recovered by filtration, washed with MIBK, water and acetone and dried overnight at 37°C.

EXAMPLE 13

An enzymic hydrolysis of potassium benzyl penicillin was carried out generally as described in Example 11 but at an increased concentration of potassium benzyl penicillin (i.e., 9% w/v) using 27 g of substrate in a reaction volume of 300 ml. and the enzyme concentration being double that used in Example 11. The reaction was continued for 4 hours at pH 7.8 and 37°C. wherefrom 6-APA was produced with an efficiency of 93.2%.

What is claimed is:

1. A process for the preparation of 6-aminopenicillanic acid which consists essentially in:
   a. contacting, in aqueous solution at a pH within the range 6.0 to 9.0, benzylpenicillin or phenoxymethylpenicillin or a salt thereof with a water-soluble enzyme complex consisting of penicillin deacylase enzyme bonded to a sucrose-epichlorhydrin copolymer;
   b. separating the said enzyme complex from the aqueous reaction mixture in an ultrafiltration unit;
   c. recovering the formed 6-aminopenicillanic acid; and
   d. re-using the separated aqueous solution of the said enzyme complex by contacting it with a further quantity of the penicillin.

2. A process for the preparation of 6-aminopenicillanic acid according to claim 1 which is operated in a continuous manner wherein the reaction mixture from step (a) is withdrawn from a reactor vessel to the said ultrafiltration unit at approximately the same rate as unreacted penicillin is added thereto and wherein the retentate solution from the ultrafiltration unit is recycled to the said reactor vessel.

3. A continuous process for the preparation of 6-aminopenicillanic acid according to claim 2, wherein the permeate solution from the said ultrafiltration unit is fed to a second reactor vessel and thence to a second ultrafiltration unit, the retentate solution from which is recycled to the said second reactor vessel and wherein 6-aminopenicillanic acid is recovered from the said second ultrafiltration unit.

4. A process according to claim 3, wherein a solution of benzylpenicillin of about 7% w/v is employed and the average residence times of the reaction mixture in the two said reactor vessels are arranged to be about 3 hours and 1 hour respectively and wherein the retentate solution from the said second ultrafiltration unit contains substantially no unreacted penicillin.

5. A water-soluble enzyme complex consisting of a penicillin deacylase enzyme bonded to a sucrose-epichlorhydrin copolymer.

* * * * *